(12) United States Patent
Trent et al.

(10) Patent No.: US 10,318,673 B2
(45) Date of Patent: Jun. 11, 2019

(54) MULTI-USER CAX ASSEMBLY LOAD TIME REDUCTION WHILE MAINTAINING INTER-PART CONSISTENCY

(71) Applicant: Brigham Young University, Provo, UT (US)

(72) Inventors: Mark S. Trent, Provo, UT (US); Daniel Staves, Orem, UT (US); Ammon Hepworth, Provo, UT (US)

(73) Assignee: Brigham Young University, Provo, UT (US)

( * ) Notice: Subject to any disclaimer, the term of this patent is extended or adjusted under 35 U.S.C. 154(b) by 29 days.

(21) Appl. No.: 15/621,895

(22) Filed: Jun. 13, 2017

(65) Prior Publication Data

US 2017/0357741 A1 Dec. 14, 2017

Related U.S. Application Data

(60) Provisional application No. 62/349,401, filed on Jun. 13, 2016.

(51) Int. Cl.
| | |
|---|---|
| *G06F 17/50* | (2006.01) |
| *G06F 11/14* | (2006.01) |
| *G06F 9/50* | (2006.01) |
| *G06F 13/26* | (2006.01) |
| *G06F 16/23* | (2019.01) |

(52) U.S. Cl.
CPC ............ *G06F 17/5009* (2013.01); *G06F 9/50* (2013.01); *G06F 11/1448* (2013.01); *G06F 11/1466* (2013.01); *G06F 13/26* (2013.01); *G06F 16/2358* (2019.01); *G06F 17/50* (2013.01); *G06F 2217/02* (2013.01)

(58) Field of Classification Search
CPC . G06F 17/30386; G06F 17/50; G06F 17/5009
See application file for complete search history.

(56) References Cited

U.S. PATENT DOCUMENTS

| | | | | |
|---|---|---|---|---|
| 7,216,254 | B1* | 5/2007 | Rajan | G06F 11/1435 |
| | | | | 714/15 |
| 9,471,438 | B1* | 10/2016 | Jacques Da Silva | ........................ |
| | | | | G06F 11/1451 |
| 9,965,572 | B1* | 5/2018 | Winn | G06F 17/50 |
| 2011/0173239 | A1* | 7/2011 | Sayed | G06F 9/542 |
| | | | | 707/821 |
| 2011/0246879 | A1* | 10/2011 | White | G06F 17/3089 |
| | | | | 715/704 |
| 2012/0221519 | A1* | 8/2012 | Papadomanolakis | ........................ |
| | | | | G06F 11/3688 |
| | | | | 707/615 |

(Continued)

*Primary Examiner* — Hal Schnee
(74) *Attorney, Agent, or Firm* — Kunzler Bean & Adamson

(57) ABSTRACT

A method for loading an assembly for a CAx client includes determining referenced part IDs referenced by the assembly and for each referenced part ID, determining a latest applied command of saved checkpoints for each part file of a referenced part ID. The method further includes determining any unapplied commands for each referenced part ID, loading the part file for each referenced ID with the latest applied command to the CAx client, and applying the unapplied commands sequentially by command number. A computer program product such as a computer readable medium and a computer system corresponding to the above method are also disclosed herein.

9 Claims, 7 Drawing Sheets

(56) References Cited

U.S. PATENT DOCUMENTS

| | | | | |
|---|---|---|---|---|
| 2014/0149882 A1* | 5/2014 | Nysetvold | ............ | H04L 65/403 |
| | | | | 715/751 |
| 2014/0194211 A1* | 7/2014 | Chimes | ................ | A63F 13/497 |
| | | | | 463/43 |
| 2015/0356207 A1* | 12/2015 | Reitman | ............ | G06F 17/5095 |
| | | | | 703/1 |

* cited by examiner

314a

Part Files Table

| File ID | Part ID | Command Number | Part File | Referencing Part IDs |
|---|---|---|---|---|
| 13 | PartA | 14 | <PartA.prt> | PartA |
| 14 | PartB | 13 | <PartB.prt> | PartA, PartB |
| 15 | PartC | 11 | <PartC.prt> | PartA, PartB |
| 16 | PartC | 17 | <PartC.prt> | PartC |

Command Table

| Command Number | Part ID | Command Data |
|---|---|---|
| 1 | PartA | *** |
| 2 | PartA | *** |
| 3 | PartB | *** |
| 4 | PartC | *** |
| 5 | PartB | *** |
| 6 | PartC | *** |
| 7 | PartB | *** |
| 8 | PartA | *** |
| 9 | PartA | *** |
| 10 | PartB | *** |
| 11 | PartC | *** |
| 12 | PartA | *** |
| 13 | PartB | *** |
| 14 | PartA | *** |
| 15 | PartC | *** |
| 16 | PartC | *** |
| 17 | PartC | *** |
| 18 | PartB | *** |

Assembly Tree
Part A
└ Part B
  └ Part C

| Part A | Part B | Part C |
|--------|--------|--------|
| 1      | 3      | 4      |
| 2      | 5      | 6      |
| 8      | 7      | 11     |
| 9      | 10     | 15     |
| 12     | 13     | 16     |
| 14     | 18     | 17     |

MULTI-USER CAX ASSEMBLY LOAD TIME REDUCTION WHILE MAINTAINING INTER-PART CONSISTENCY

RELATED APPLICATIONS

This application claims priority to U.S. provisional application 62/349,401 entitled "Multi-User CAx Assembly Load Time Reduction While Maintaining Inter-Part Consistency" and filed on Jun. 13, 2016, which is incorporated herein by reference in its entirety.

FIELD

The subject matter disclosed herein relates to computer aided technologies (CAx) such as computer aided design, engineering, analysis and manufacture in general, and reducing load time in particular.

BACKGROUND OF THE INVENTION

CAx systems are often used to design and analyze large and complex engineering models, including many thousands of parts and features. The size and complexity of CAx databases will only increase as CAx systems are rearchitected to accommodate multiple concurrent users.

Current multi-user CAx systems, which employ an operation-by-operation duplication scheme to maintain consistency between clients, can be plagued with extremely slow load times because loads require operations to be performed one at a time on each client. The time of skilled designers and analysts is valuable and any improvement in the time it takes to load and render a model translates directly to cost savings.

Given the foregoing, what is needed is additional and improved systems and methods for computer-assisted design, and in particular, systems and methods for reducing load-time in while maintaining inter-part consistency. The embodiments disclosed herein were developed in response to these and other issues.

SUMMARY OF THE INVENTION

The subject matter of the present application has been developed in response to the present state of the art, and in particular, in response to the problems and needs of CAx systems that have not yet been fully solved by currently available systems and methods. Generally, the subject matter of the present application has been developed to provide valid inter-part dependency in loading of assemblies utilizing a save/load paradigm that overcomes at least some of the above-discussed shortcomings of prior art systems.

Embodiments of a method for loading an assembly for a CAx client are disclosed. In an embodiment, the method for loading an assembly for a CAx client includes determining referenced part IDs referenced by the assembly and for each referenced part ID, determining a latest applied command of saved checkpoints for each part file of a referenced part ID. The method further includes determining any unapplied commands for each referenced part ID, loading the part file for each referenced part ID with the latest applied command to the CAx client, and applying the unapplied commands sequentially by command number. Other embodiments of a method are also disclosed.

Embodiments of a computer program product are also disclosed. In an embodiment, the computer program product includes a computer readable storage medium having program instructions embodiment therewith. The program instructions are readable/executable by a processor to cause the processor to perform operations including determining referenced part IDs referenced by the assembly and for each referenced part ID, determining a latest applied command of saved checkpoints for each part file of a referenced part ID. The program instructions further cause the processor to perform operations including determining any unapplied commands for each referenced part ID, loading the part file for each referenced part ID with the latest applied command to the CAx client, and applying the unapplied commands sequentially by command number. Other embodiments of computer program products are disclosed. Embodiments of a system is also disclosed.

It should be noted that references throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a schematic block diagram illustrating one embodiment of a part files table in accordance with the present invention; and FIG. 6 is a schematic block diagram illustrating one embodiment of a global command table in accordance with the present invention;

FIG. 7 is a schematic diagram illustrating one embodiment of part dependencies in accordance with the present invention;

FIG. 8 is a schematic diagram illustrating one embodiment of saved checkpoints for part IDs in accordance with the present invention.

DETAILED DESCRIPTION OF THE INVENTION

Figure 1:
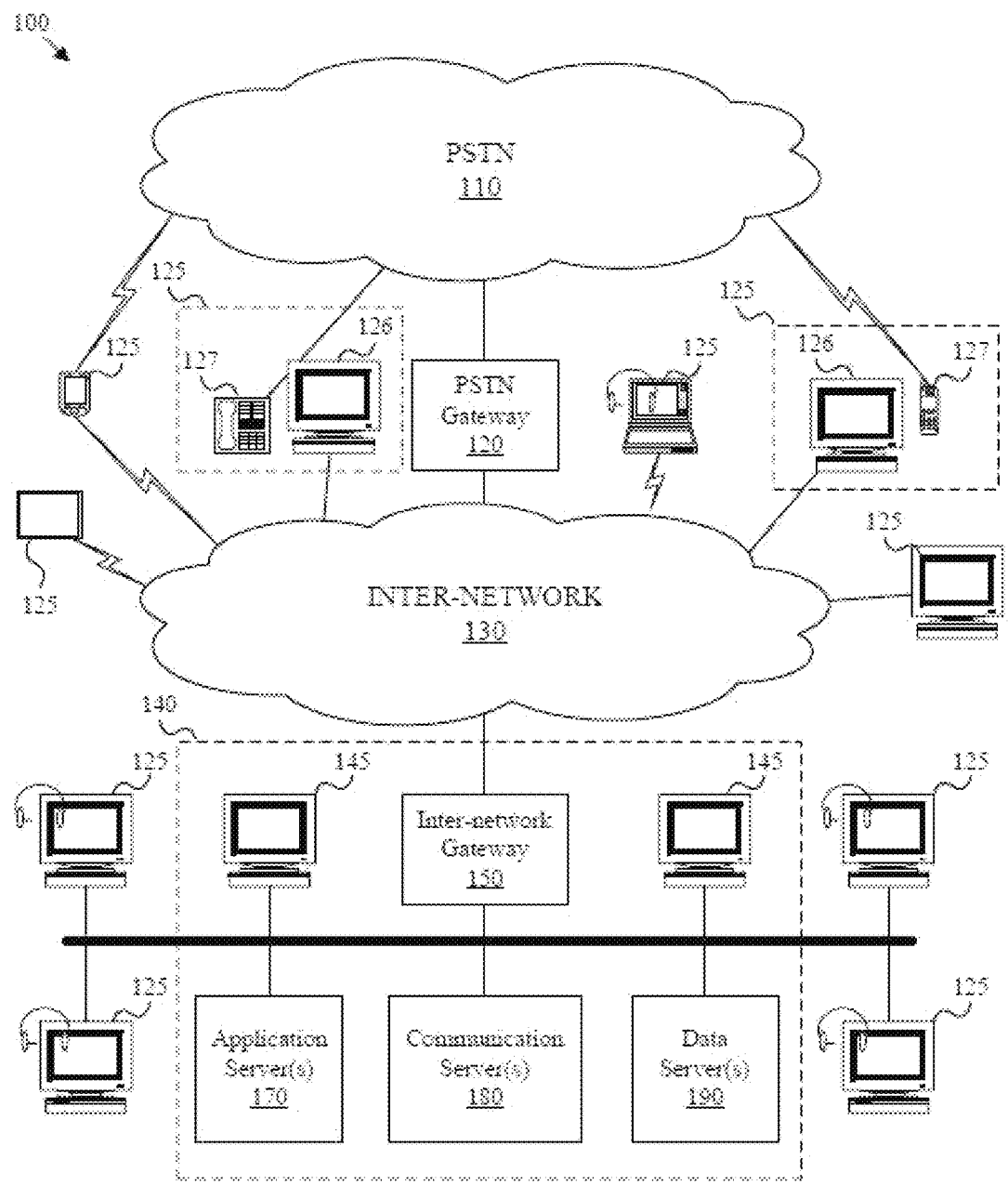
FIG. 1 is a schematic diagram illustrating one embodiment of a computing and communications infrastructure that is applicable to implement the embodiments of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer or other programmable apparatus or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations which are not shown or described in detail to avoid obscuring aspects of an embodiment.

Current multi-user CAx systems, which employ an operation-by-operation duplication scheme to maintain consistency between clients, can be plagued with extremely slow load times because loads require operations to be performed one at a time on each client. A previous solution employed saved files as 'checkpoints' allowing for a quicker loading pattern by loading the file, and then only performing the operations which occurred after the save. This works well in single parts, but difficulties arise in the assembly paradigm, in which multiple parts are used.

Assemblies often take advantage of inter-part dependencies (assembly constraints, wave-linking, inter-part expressions, etc.) which require all referenced information to be immediately available upon demand. When individual parts of an assembly are saved at different states the inter-part dependencies may break because the entities required to make the inter-part link have been changed or consumed by later operations saved in the save file.

An extreme example of this shortcoming arises in a simple assembly part with one component. The component part consists of a simple cube extruded from a sketch. The assembly part then performs a promote body command on the cube to bring the body into the top-level assembly. Both files are then closed without creating a saved file-though all commands are stored in the database for recreation later.

The part used as the component in the example is then reopened. The user deletes the cube and creates a sphere in its place. Before closing this component, the user saves the file. When the assembly part is loaded by another user, the saved component file is opened, and the promote body command is attempted. Since the cube no longer exists at this point in time in the saved file, the command is not able to be completed.

The description of elements in each figure may refer to elements of proceeding figures. Like numbers refer to like elements in all figures, including alternate embodiments of like elements.

In a multi-user environment, it is desirable to assign different areas, regions or geometries for different users to work i.e. a workspace. The assigned workspace may or may not be a contiguous region. Casually updating the model for each user may not be effective, because it is likely a user will accidently cross into another user's workspace or create conflicts with simultaneously executed operations. The result may end up creating chaos and result in a less productive or unworkable multi-user environment. Therefore, it is generally desirable that operations be serialized as they are exchanged between users or servers.

As used herein the phrase 'engineering object' refers to an electronically modeled object that may be edited by a CAx application or tool and 'CAx model' refers to the electronic model for that object. CAx applications and tools include, but are not limited to, design tools, meshing tools, simulation tools, visualization tools, analysis tools, manufacture planning tools, and manufacture simulation tools.

The following will provide, with reference to the Figures, detailed descriptions of exemplary systems for multi-user CAx loading of a design object or assembly. Detailed descriptions of corresponding computer-implemented methods will also be provided.

FIG. 1 is a block diagram of one example of a computing and communications infrastructure 100 that is consistent with one or more embodiments of the claimed invention. As depicted, the infrastructure 100 includes various systems, subsystems, and networks such as a public switched telephone network (PSTN) 110, a TDM gateway 120 connecting the PSTN to an inter-network 130, a variety of workstations 125, a data center 140 with administrative terminals 145, an inter-network gateway 150 connecting a local area network to the inter-network 130, and various servers such as application servers 170, communication servers 180, and data servers 190. The infrastructure 100 is one example of components that can be operably interconnected to provide an infrastructure for a collaborative CAx system.

Each workstation 125 may include a separate computing device 126 and a communications device 127 or the computing device and communications device may be integrated into the workstation 125. Examples of the communications device 127 include a phone, a VOW device, an instant messaging device, a texting device, a browsing device, and the like. The computing devices 126 may enable graphical view selection. The communications devices 127 may enable users to communicate with other CAx system users.

The inter-network 130 may facilitate electronic communications between the various workstations and servers. In one embodiment, the inter-network 130 is the internet. In another embodiment, the inter-network 130 is a virtual private network (VPN).

Various servers such as blade servers within the data center 140 function cooperatively to facilitate loading of CAx models or assemblies by local and remote users. For example, the application servers 170 may provide one or more CAx applications to the local and remote users. Some users may have the CAx applications installed on their local computing devices 126.

In some embodiments, the communication servers 180 facilitate communications between the users through various channels or services such as VOW services, email services, instant messaging services, short message services, and text messaging services. The workstations 125 may leverage such services for user to user communications via the communication servers 180 or via other available service platforms.

The data servers 190 or the like may store CAx models of design or engineering objects within various model files or records at various checkpoints. The data servers may replicate copies of the models for use by various users. Some users may have a local copy of a model.

Figure 2:
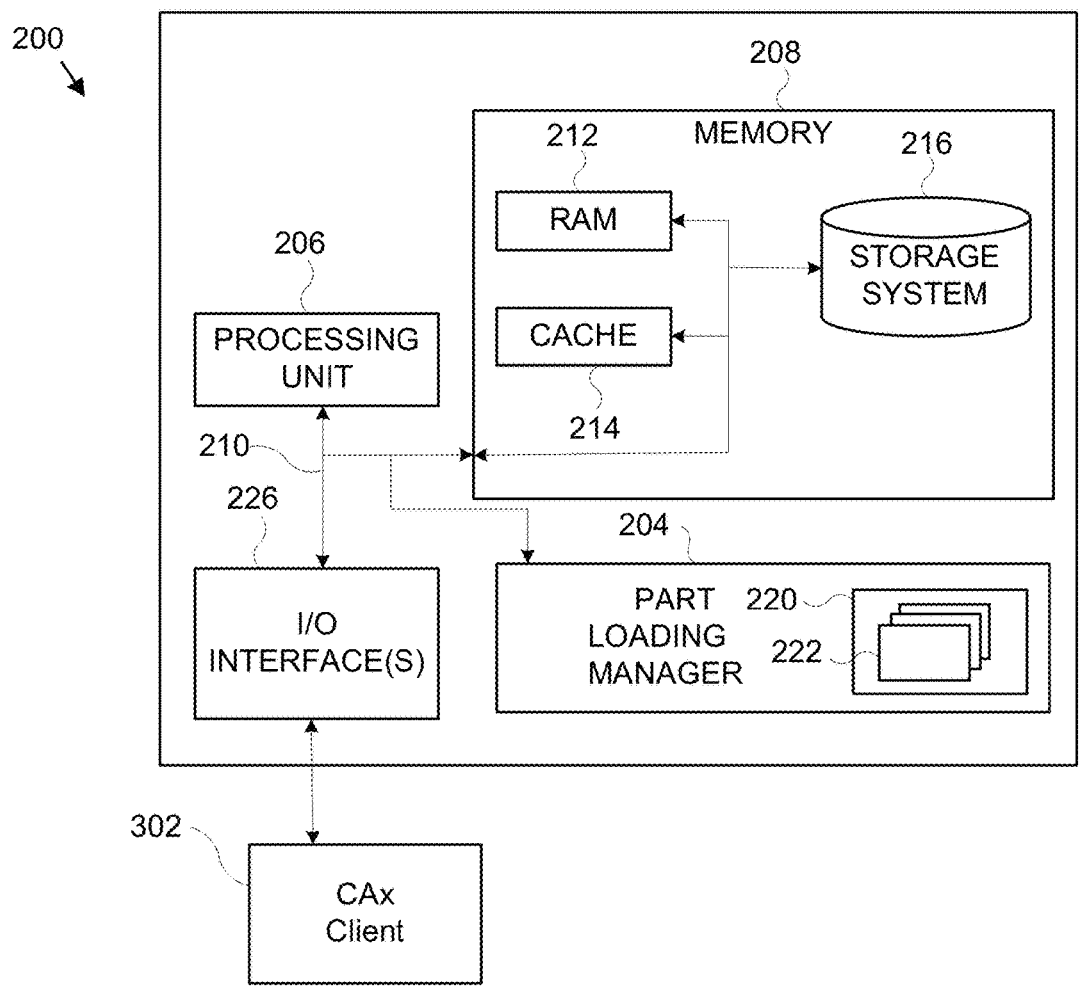
FIG. 2 is a schematic block diagram illustrating one embodiment of a computer system that is applicable to implement the embodiments of the present invention.

FIG. 2 shows an exemplary computer system 200 that is applicable to implement the embodiments of the present disclosure. Computer system 200 is only illustrative and is not intended to suggest any limitation as to the scope of use or functionality of embodiments of the disclosure described herein. The components of computer system 200 may include, but are not limited to, a part loading manager 204, one or more processors or processing units 206, a system memory 208, I/O interfaces 226, and a bus 210 that couples various system components including system memory 208 to processor 206.

Bus 210 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 200 typically includes a variety of computer system readable media. Such media may be any available media that is accessible by computer system 200, and it includes both volatile and non-volatile media, removable and non-removable media.

System memory 208 can include computer system readable media in the form of volatile memory, such as random access memory (RAM) 212 and/or cache memory 214. Computer system 200 may further include other removable/non-removable, volatile/non-volatile computer system storage media. By way of example only, storage system 216 can be provided for reading from and writing to a storage media (not shown and typically called a "drive"). Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 210 by one or more data media interfaces. As will be further depicted and described below, part loading manager 204 may include at least one program product having a set (e.g., at least one) of program modules 222 that are configured to carry out the functions of embodiments of the disclosure. In some embodiments, the program product 220 is stored on memory 208.

Program/utility 220, having a set (at least one) of program modules 222, may be stored in memory 208 by way of example, and not limitation, as well as an operating system, one or more application programs, other program modules, and program data. Each of the operating system, one or more application programs, other program modules, and program data, or some combination thereof, may include an implementation of a networking environment. Program modules 222 generally carry out the functions and/or methodologies of embodiments of the disclosure as described herein.

Computer system 200 may also communicate with one or more external devices such as a keyboard, a pointing device, a display, etc.; one or more devices that enable a user to interact with computer system 200; any devices (e.g., network card, modem, etc.) that enable computer system 200 to communicate with one or more other computing devices; and/or a CAx client 302. Such communication can occur via input/output (I/O) interfaces 226. Still yet, computer system 200 can communicate with one or more networks such as a local area network (LAN), a general wide area network (WAN), a storage area network (SAN), and/or a public network (e.g., the Internet) via network adapter. A network adapter communicates with the other components of the computer system 200 via bus 210. While not shown, other hardware and/or software components could be used in conjunction with computer system 200. Examples, include, but are not limited to, microcode, device drivers, redundant processing units, external disk drive arrays, RAID systems, tape drives, and data archival storage systems, etc.

In one embodiment, the computer system 200 is part of or is in communication with a network such. Communication with other devices, apparatuses, or systems on the network may be handled by the I/O interfaces 226 or the network adapter as needed. In some embodiments, the computer system 200 includes various modules, described in greater detail below, to manage the part loading manager 204. In some embodiments, the computer system 200 interacts with a plurality of CAx clients 302 and a server, such as server 316.

Fewer or more than these functions and other functions may be accomplished wholly or in part by the computer system 200 or another embodiment of the computer system 200. In some implementations, various components of the computer system 200 are part of computing and communications infrastructure 100 or the environment 300 depicted in FIG. 3.

Figure 3:
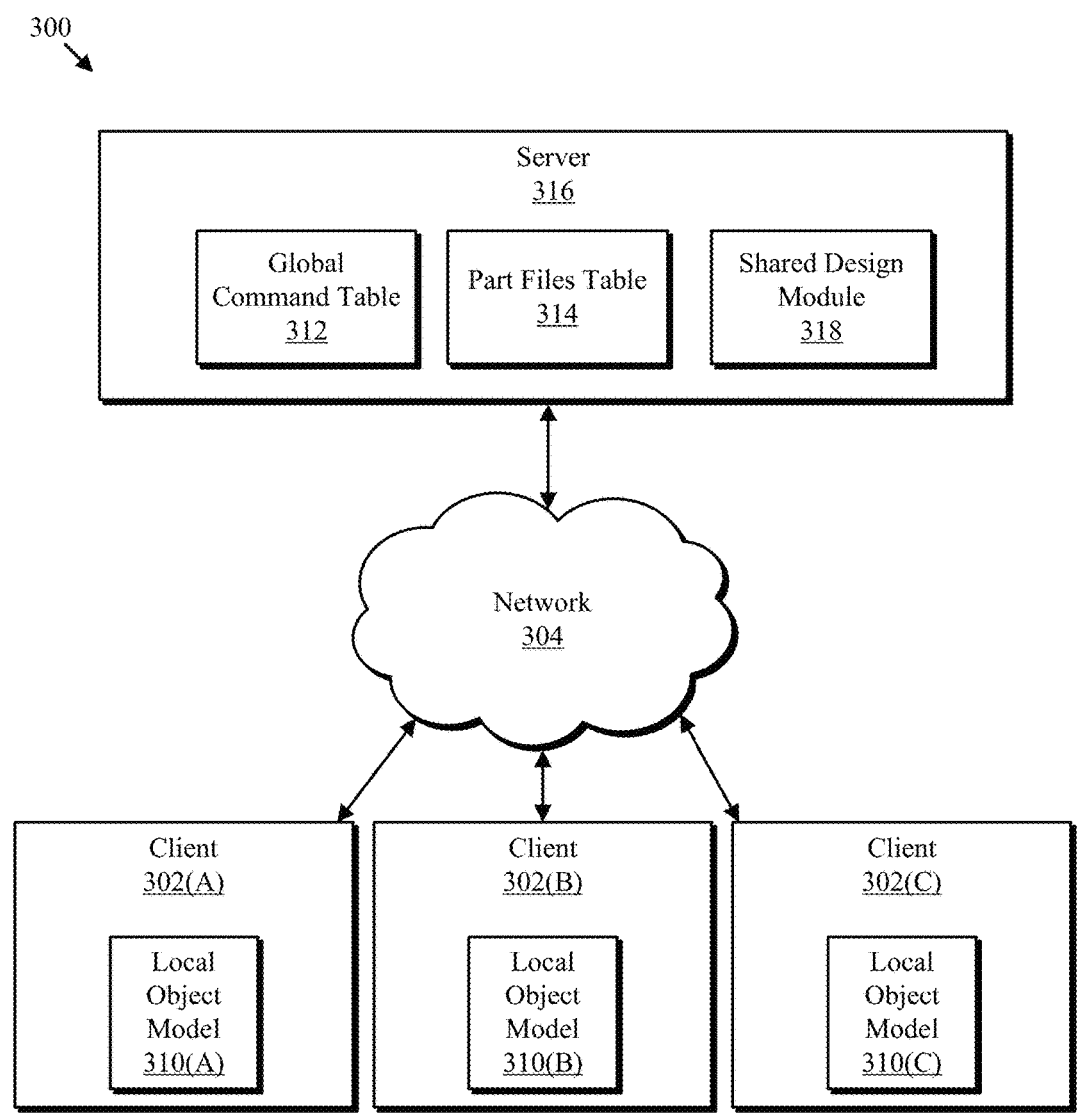
FIG. 3 is a schematic block diagram illustrating one embodiment of a system for multi-user CAx editing and loading of a model of a design object in accordance with the present invention.

FIG. 3 is a schematic drawing of an environment 300 wherein multi-user CAx editing and loading of assemblies may be deployed. As illustrated in this figure, environment 300 may include one or more clients 302, a network 304, and a server 316. Server 316 may host shared design module 318. Clients 302 may host local model copies 310 of a shared design model (not shown) maintained by the shared design module 318.

Clients 302 generally represent any type or form of computing device capable of reading computer-executable instructions. Examples of clients 302 include, without limitation, laptops, tablets, desktops, servers, combinations of one or more of the same, or any other suitable computing device.

Server 316 generally represents any type or form of computing device or combinations of computing devices that is capable of storing, comparing, and/or providing data, as well as providing back-end processing services. Server 106 may represent a commercial or publicly-accessible service or a service provided to a single organization. Examples of server 316 include, without limitation, high-performance clusters, virtual machines, application servers, web servers, and/or database servers configured to provide various database services and/or run software applications, or combinations of one or more of the same.

In certain embodiments, server 316 may represent combinations of software applications and physical computing systems configured to perform various tasks. For example, server 316 may include a server that manages one or more tables, such as a global command table 312 or a part files table 314 and various saved checkpoints for part IDs. In one example, shared design module 318 may be configured to store geometry, material, load, and/or environment data representing one or more design models. Shared design module 318 may represent portions of a single database or computing device or a plurality of databases or computing devices capable of being accessed by computing devices included in server 316 and/or clients 302(A), 302(B), and 302(C).

Network 304 generally represents any medium or architecture capable of facilitating communication or data transfer. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 304 may facilitate communication or data transfer using wireless or wired connections. In one embodiment, network 104 may facilitate communication between clients 302 and server 316.

Embodiments of the invention enforce part and assembly load order to ensure valid inter-part dependencies within an assembly. This is accomplished, in some embodiments, by ensuring all operations are performed in their global operation order and utilizing a part save/load paradigm. Part and assembly load order is enforced by tagging each command with a unique command number.

In some embodiments, the command number is global to all part files, subassemblies, and assemblies. That is, different parts within an assembly do not share command numbers. Command numbers are assigned as operations are performed on parts (or subassemblies or assemblies). In some embodiments, the command numbers are assigned in sequential order as the commands are communicated to the server 316 from the respective client 302(A), 302(B), 302(C) on which the part is being operated, which may be a local object 310. The command numbers may be stored in a global command table 312 which may include the command number, the command information, and the part ID of the part to which the command is applied (see e.g, FIG. 6).

Referring to FIG. 6, sequential command numbers are stored in the command table 312a. The command numbers are associated to a part ID and include the command data to perform the command operations. As command operations are performed on PartA, PartB, and PartC, as depicted, command numbers are assigned in the sequential order of command operations. By performing all command operations in sequence during an assembly, inter-part dependencies will remain valid and ensure a proper build of the assembly. However, in many cases the number of command operations to be applied in an assembly may be quite large. Embodiments described herein allow for a saved checkpoint of a saved part file to be loaded with operations already performed. This greatly reduces load time. By referencing the part files table 314, it can be determined what the latest applied command on a saved part. By referencing the command table 312, the number of unapplied commands may be determined also.

Part files may also be saved in various contexts including assemblies, subassemblies, and the part itself. With the various contexts a particular part may have been saved at different checkpoints. In other words, a part may have been saved with a particular command operation as the last applied command, while an assembly or subassembly of the part may be saved with a different command operation as the last applied command. This may be illustrated by example. Referring to FIG. 5, PartC includes two contexts, the part itself as illustrated in bottom row following File ID number 16. PartC in this particular context has a last applied command number of 17. PartC also has a context of an assembly that references PartA and PartB. Part C in this particular context has a last applied command number of 11. As depicted, when loading an assembly, a part file with PartC can be served to a CAx client with the last applied command number of 11 or 17. By loading the part file with the latest applied command to the CAx client, load time can be reduced by loading PartC with command operation corresponding to command number 17 already applied.

When a part file is saved, the part file is uploaded to a server with the command number of the last operation performed. Information regarding the part file and the latest applied command are stored in the part files table 314. The part files table 314 may include information such as File ID number, a part ID, the command number of the latest applied command, the part file and referencing part IDs referenced by the part file (which may be a part, a subassembly, or an assembly (see e.g., FIG. 5).

Figure 4:
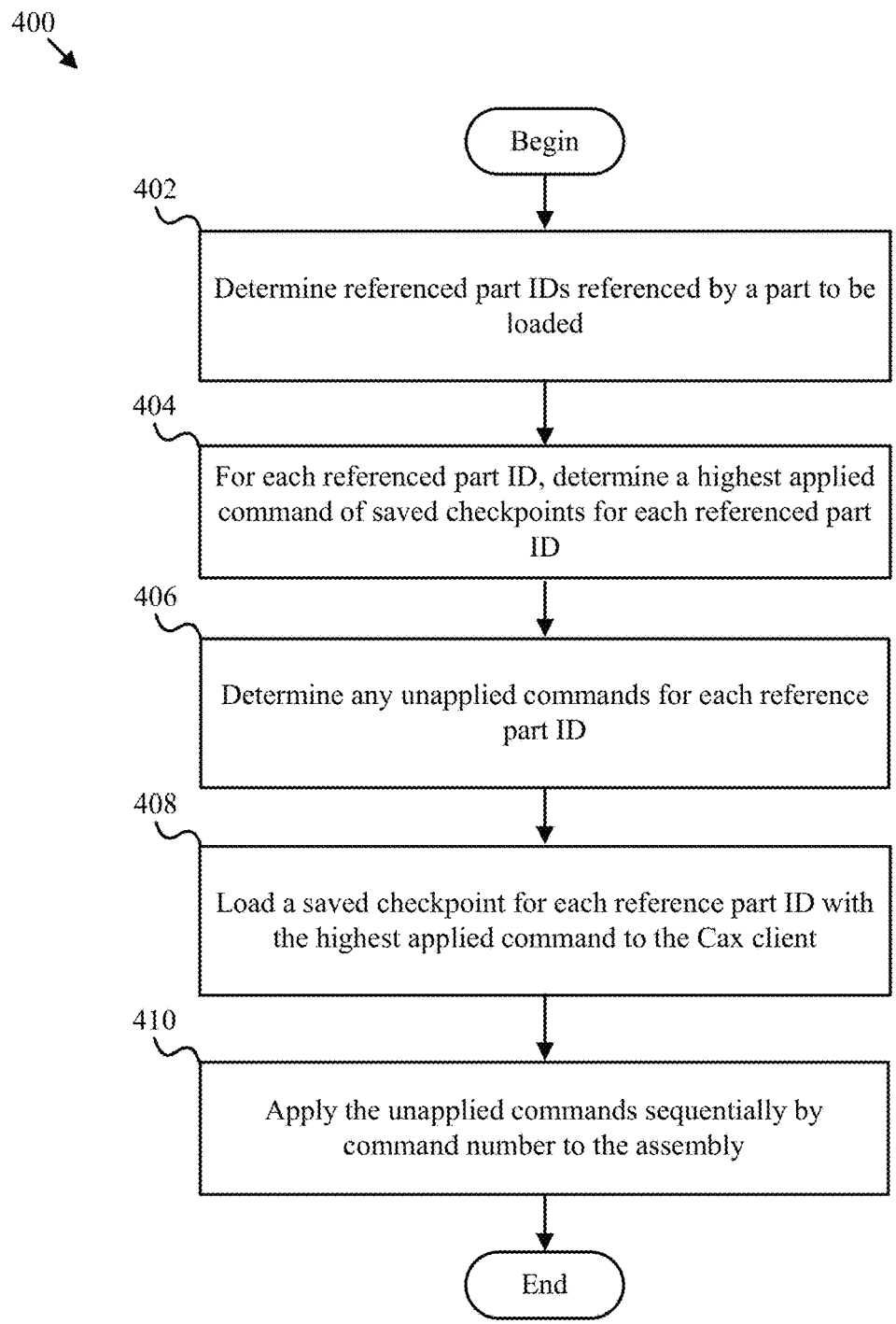
FIG. 4 is a schematic flow chart diagram illustrating one embodiment of a method in accordance with the present invention.

FIG. 4 is a schematic flow chart diagram illustrating one embodiment of a method 400 in accordance with the present invention. At block 402, the method 500 includes determining referenced part IDs referenced by the assembly. At block 404, for each referenced part ID, a latest applied command of saved checkpoints for each part file of a referenced part ID is determined. At block 406, any unapplied commands for each referenced part ID is determined. At block 408, the part file for each referenced part ID with the latest applied command is loaded to the CAx client. At block 410, the unapplied commands are applied sequentially to the assembly according to their command number.

Figure 9:
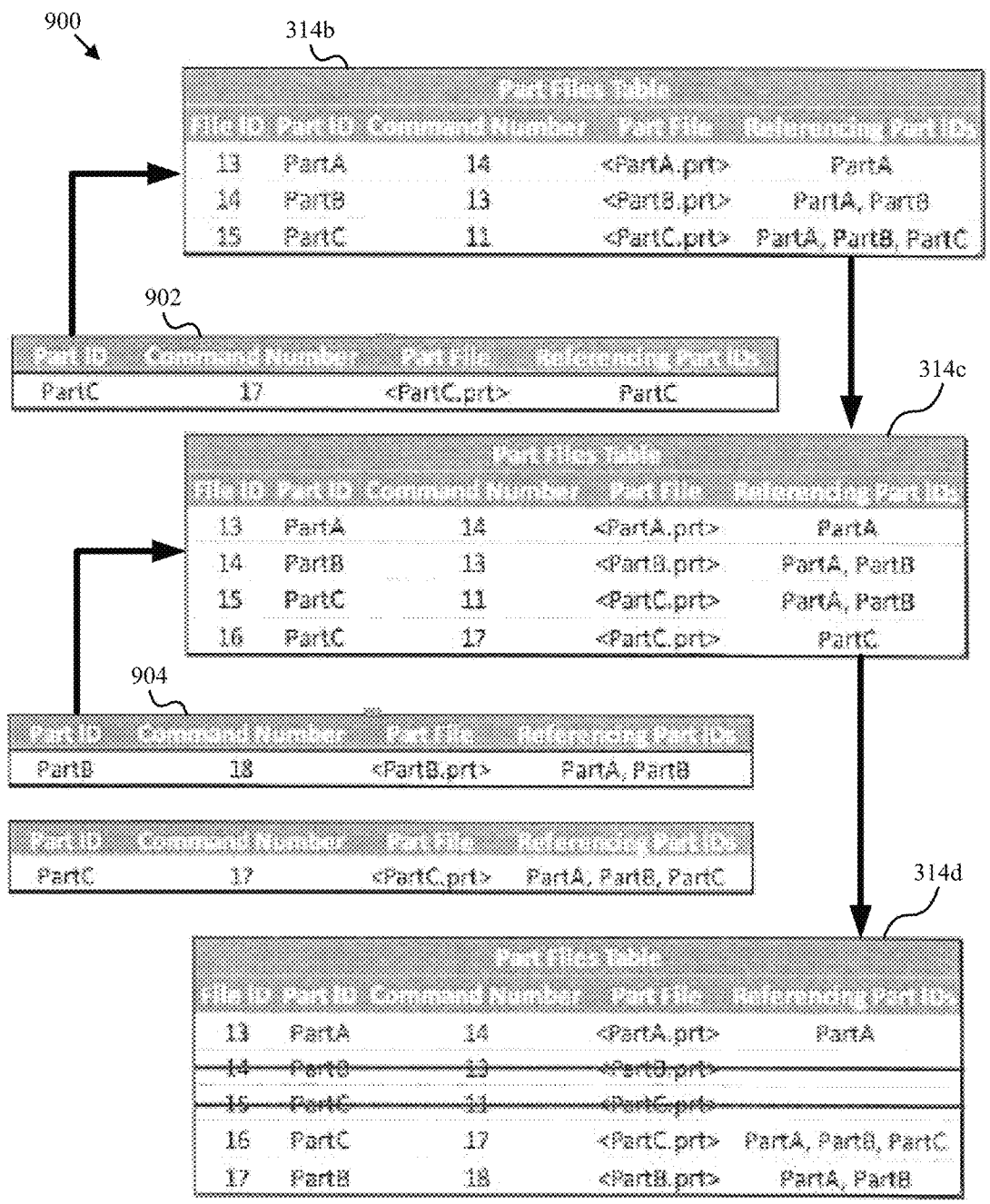
FIG. 9 is a schematic block diagram illustrating one embodiment of a save/delete process in accordance with the present invention.

FIGS. 5-9 refer to examples that are described for illustrative purposes only. Referring to FIG. 7, an assembly tree diagram 700 is shown to show the referencing relationships between Part A, Part B, and Part C. Part A references Part A itself, Part B references itself and Part A, and Part C references itself and Part B and Part A. Referring to FIG. 9, an embodiment of a part files table 314b is shown. The part files table 314b depicts the last applied command number for the three parts (Part A-14, Part B-13, and Part C-11). The saved checkpoint is depicted in FIG. 8 by enclosure 802 which schematically shows Part A saved with command operation corresponding to command number 14 already applied. Part B is saved with command operation corresponding to command number 13 already applied. Part C is saved with command operation corresponding to command number 11 already applied. As seen in FIG. 9, Part C was opened independent of the saved assembly represented by enclosure 802. Command operations corresponding to command numbers 15, 16, and 17 were then performed and Part C was saved in a separate context (the part itself) with further operations. The saved context is represented by enclosure 804. As depicted in FIG. 9 by revised part files table 314c, Part C now includes two saved checkpoints, either of which can be utilized in future loading of assemblies.

The assembly is then reopened. During the reopening of the assembly many options may be performed. For example each command operation can be applied 1 thru 17. As such a loading of the assembly is time consuming, each part may be loaded at the saved checkpoint with the latest applied command. Referencing part files table 314c, Part A includes only one context with the command operation corresponding to command number 14 already applied. Thus Part A at this saved checkpoint is served to the CAx client. Part B also includes only one context and thus the Part B at the saved checkpoint with the command operation corresponding to command number 13 already applied is served to the CAx client. Part C, however, includes two contexts, depicted by File ID 15 and File ID 16. It is determined that File ID 16 includes the latest applied command for Part C. Thus, File ID 16 is served to CAx client instead of File ID 15. Load time is reduced by serving the referenced part ID with the latest applied command. No unapplied commands are present now.

With the assembly now open, a command operation corresponding to command number 18 is performed on Part B. The assembly is saved and uploaded to the server and part files table 314d is shown in updated form. During the saving process, the data for Part B has been updated and as Part B now has a later applied command of 18 that File ID 14 which included only a latest applied command of 13. As a result of the discrepancy, a new File ID number 17 is created. As the new File ID number 17 references Part A the referencing information for File ID number 14 is removed so they both don't reference the same parts. File ID number 14 no longer references Part A. In the newly filed assembly, no command operations were performed on Part C. As such a new File ID number is not required for Part C. However, as Part C was saved in the assembly, the referencing part IDs is updated to reference Part A, Part B, and Part C. As File ID now references Part A and Part B, the referencing Part IDs of File ID 15 are removed.

The server may then, in some embodiments, evaluated the part files table and delete File ID 14 and File ID 15 because they do not reference any part IDs. As there is no situation in which those parts are needed for an assembly or subassembly build, and new File IDs 16 and 17 can be used, File ID 14 and File ID 15 are deleted and removed. Referring to FIG. 8 the enclosure 806 depicts that saved checkpoint for the assembly of Part A, Part B, and Part C.

When an assembly requests a saved filed of a part, the saved file utilized is determined by the command number saved with the file. By following the logic of loading the files with the latest applied command, load time is greatly reduced. When an assembly is requested at a CAx client, the first operation may be to determine the parts that are referenced by the assembly. This information may be included in the part files table 314. For each part that is referenced, the referenced part ID with the latest applied command is determined. As the same part may be saved in various contexts (such as the part itself, in a subassembly, in an assembly) the version with the latest applied command is determined.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The preceding depiction of the collaborative CAx applications and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for loading an assembly comprising a plurality of parts for a computer-aided technology (CAx) client, the method comprising:
   receiving a part table that indicates a latest applied command for a last saved checkpoint for each part in the assembly;
   receiving at least one command table that indicates, in sequential order, commands that have been sequentially applied to each part in the assembly;
   determining, via the part table and the at least one command table, any unapplied commands that are subsequent to the last applied command for the last saved checkpoint for each part in the assembly;
   loading the last saved checkpoint for each part in the assembly to provide loaded parts to the CAx client; and
   applying the unapplied commands in sequential order to the loaded parts to provide a loaded assembly to the CAx client.

2. The method of claim 1, further comprising uploading a new saved checkpoint with a new latest applied command to a server.

3. The method of claim 2, further comprising deleting a saved checkpoint that is not the last saved checkpoint.

4. A computer program product comprising a computer readable storage medium having program instructions embodied therewith, the program instructions readable/executable by a processor to cause the processor to:
   receive a part table that indicates a latest applied command for a last saved checkpoint for each part in an assembly comprising a plurality of parts;
   receive at least one command table that indicates, in sequential order, commands that have been sequentially applied to each part in the assembly;
   determine, via the part table and the at least one command table, any unapplied commands that are subsequent to the last applied command for the last saved checkpoint for each part in the assembly;
   load the last saved checkpoint for each part in the assembly to provide loaded parts to a computer-aided technology (CAx) client; and
   apply the unapplied commands sequentially to the loaded parts to provide a loaded assembly to the CAx client.

5. The computer program product of claim 4, the program instructions readable/executable by the processor to further cause the processor to upload a new saved checkpoint with a new latest applied command to a server.

6. The computer program product of claim 4, the program instructions readable/executable by the processor to further cause the processor to delete a saved checkpoint that is not the last saved checkpoint.

7. A computer system comprising:
   a processor on a CAx client;
   a memory;

a computer readable medium having instructions encoded thereon to:

receive a part table that indicates a latest applied command for a last saved checkpoint for each part in an assembly comprising a plurality of parts;

receive at least one command table that indicates, in sequential order, commands that have been sequentially applied to each part in the assembly;

determine, via the part table and the at least one command table, any unapplied commands that are subsequent to the last applied command for the last saved checkpoint for each part in the assembly;

load the last saved checkpoint for each part in the assembly to provide loaded parts to a computer-aided technology (CAx) client; and apply the unapplied commands sequentially to the loaded parts to provide a loaded assembly to the CAx client.

8. The computer system of claim 7, the computer readable medium having further instructions encoded thereon to upload a new saved checkpoint with a new latest applied command to a server.

9. The computer system of claim 7, the computer readable medium having further instructions encoded thereon to delete a saved checkpoint that is not the last saved checkpoint.

* * * * *